United States Patent
Huang et al.

(10) Patent No.: US 7,359,096 B2
(45) Date of Patent: Apr. 15, 2008

(54) FLOATING WINDOW

(75) Inventors: Yin-Chun Huang, Hsinchu (TW); Chih-Wen Huang, Hsinchu (TW)

(73) Assignee: Transpacific IP, Ltd., Taipei (TW)

( * ) Notice: Subject to any disclaimer, the term of this patent is extended or adjusted under 35 U.S.C. 154(b) by 947 days.

(21) Appl. No.: 10/063,739

(22) Filed: May 9, 2002

(65) Prior Publication Data

US 2003/0210432 A1    Nov. 13, 2003

(51) Int. Cl.
*H04N 1/04* (2006.01)
(52) U.S. Cl. .................... 358/497; 358/496
(58) Field of Classification Search ............ 358/474, 358/506, 487, 405, 408, 483, 493, 496, 497; 356/139.05
See application file for complete search history.

(56) References Cited

U.S. PATENT DOCUMENTS

| | | | | |
|---|---|---|---|---|
| 4,736,919 A | * | 4/1988 | Bessinger | 248/250 |
| 4,939,879 A | * | 7/1990 | Gold | 52/208 |
| 5,718,336 A | * | 2/1998 | Haarlander | 206/542 |
| 6,678,075 B1 | * | 1/2004 | Tsai et al. | 358/487 |
| 2002/0118401 A1 | * | 8/2002 | Chiu | 358/474 |
| 2003/0058488 A1 | * | 3/2003 | Hsu | 358/506 |
| 2003/0063333 A1 | * | 4/2003 | Boll | 358/494 |
| 2003/0076550 A1 | * | 4/2003 | Cheung et al. | 358/474 |
| 2003/0183617 A1 | * | 10/2003 | Platt | 219/452.11 |

FOREIGN PATENT DOCUMENTS

JP    10-194649    *    7/1998

* cited by examiner

*Primary Examiner*—Jerome Grant, II
(74) *Attorney, Agent, or Firm*—Stolowitz Ford Cowger LLP

(57) ABSTRACT

A floating window, suitable for use in a flatbed scanner. The flatbed scanner has at least a top lid and a chassis. The floating window includes a transparent flat panel disposed under an opening of a top lid. A supporting structure and a limiting structure are further installed on the top lid, and a flexible structure is Installed between the supporting structure and the limiting structure. While being pushed by the chassis and pressed by the flexible structure, the transparent flat panel is in a floating status. When the chassis is periodically shifting to perform scanning, the transparent flat panel is correspondingly undulating up and down according to the periodic movement of the chassis; and consequently, the document disposed on the transparent flat panel is shifted up and down accordingly.

40 Claims, 3 Drawing Sheets

FLOATING WINDOW

BACKGROUND OF INVENTION

1. Field of the Invention

The invention relates in general to a transparent window, and more particular, to a floating window suitable for use in a flatbed scanner.

2. Related Art of the Invention

In the recent years, the great advancement of computer and the highly developed Internet and multi-media techniques allow extracting an image pattern from a digital camera (DC) directly. On the other hand, the image input process of other relative documents or pictures require an optical scanner to obtain an analog image therefrom. The analog image is then converted into a digital signal to be output. The users can thus perform display, recognition (OCR), edit, storage and output operation of the image file in a computer or an electronic product.

According to the input method, the optical scanner can be categorized into palm scanner, sheet feed scanner, drum scanner and flatbed scanner. As the flatbed scanner has a more stable image scanning quality and functions of document (film and projection film) reflection and transmission, plus an additional automatic document feeder (ADF) can be used to continuously scan a whole stack of documents with the same size; therefore, the flatbed scanner becomes one of the most commonly used optical scanners currently.

The flatbed scanner incorporates a transparent flat panel, for example, a piece of glass or transparent plastic, mounted on a top lid of thereof for disposing the document to be scanned. Using a belt driving apparatus and the bearing positioning mechanism, the optical scan module, that is, the chassis, inside of the flatbed scanner is linearly directed, such that the internal linear optical sensor of the chassis such as the charge-coupled device (CCD) or the contact image sensor (CIS) is driven to scan the surface of the document, so as to obtain an analog image signal. The analog image signal is then converted into a digital image signal to be output.

Referring to FIGS. 1A and 1B, the top lid and the transparent flat panel of a conventional flatbed scanner before assembly are schematically illustrated. In FIG. 1A, an opening 12 is formed at a center of the top lid 10 of the flatbed scanner. A transparent flat panel 20 is typically disposed on a bottom wall of the top lid 10. The surface area of the transparent flat panel 20 is slightly larger than the size of the opening 12. Therefore, the opening 12 is completely covered with the transparent flat panel 20. An adhesive region 22 is formed surrounding the opening 12 on the bottom wall of the top lid 10 to attach the transparent flat panel 20. As shown in FIG. 1B, the central region of the transparent flat panel 20 is positioned and exposed over the opening 12 where the document to be scanned is disposed.

During the assembly of the chassis of the flatbed scanner, an adjusting toll is used to adjust the focus of the chassis. For the assembly process of the transparent flat panel, as mentioned above, the transparent flat panel is directly adhered on the bottom wall of the top lid without any correction operation. Therefore, when the document is scanned by the chassis, once the top lid or the base is deformed or the internal base of the flatbed scanner is not sufficiently planar, the distance between the transparent flat panel and the chassis is not constant. Consequently, deviation between the scanned image and the actual image of the document is caused. Especially for the scanning system of the contact image sensor, or for the high-resolution or low-depth optical scan module, the distance between the transparent flat panel and the optical scan module often seriously affects the image scan quality of the flatbed scanner.

SUMMARY OF INVENTION

The invention provides a floating window used as a platform for disposing a document in a flatbed scanner. When the optical scan module is scanning the document, the floating window is undulating corresponding to the movement of the optical scan module. Consequently, the document disposed on the floating window is also undulating up and down accordingly. As a result, the distance between the document and the optical scan module is constant, so that the image scan quality of the flatbed scanner is effectively enhanced.

The present invention provides a floating window suitable for use in a flatbed scanner. The flatbed scanner has at least a top lid and an optical scan module. The top lid has an opening, under which the optical scan module is shifting periodically, a top surface, and an opposing bottom surface. The floating window comprises a supporting member disposed on the top lid. The supporting member has a supporting surface, which can be used to contact with a periphery of a bottom surface of a transparent flat panel. The floating window further comprises a limiting member disposed on the top lid. The limiting member has a limiting surface located on a periphery of the top surface. The floating window also has a flexible member located between the supporting member and the limiting member. The optical scan module can thus push the bottom surface of the transparent flat panel upward, while the flexible member can press the top surface of the transparent flat panel downward.

Therefore, when applying the floating window of a flatbed scanner for scanning, the distance between the transparent flat panel with floating window and the optical scan module is kept constant, such that the distance between the document disposed on the transparent flat panel and the optical scan module is maintained constant to enhance the image scan quality of the flatbed scanner.

BRIEF DESCRIPTION OF DRAWINGS

These, as well as other features of the present invention, will become more apparent upon reference to the drawings wherein.

DETAILED DESCRIPTION

Figure 1A:
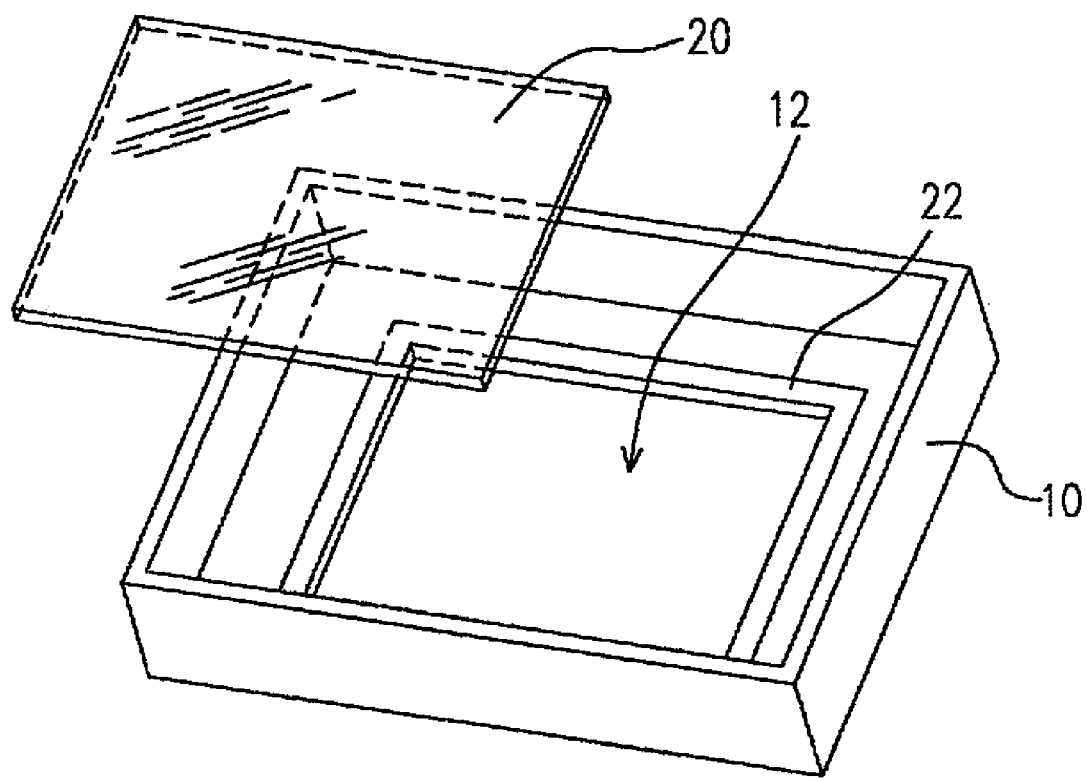
FIGS. 1A and 1B are schematic drawings of the top lid and transparent flat panel of a conventional flatbed scanner before assembly.
Figure 1B:
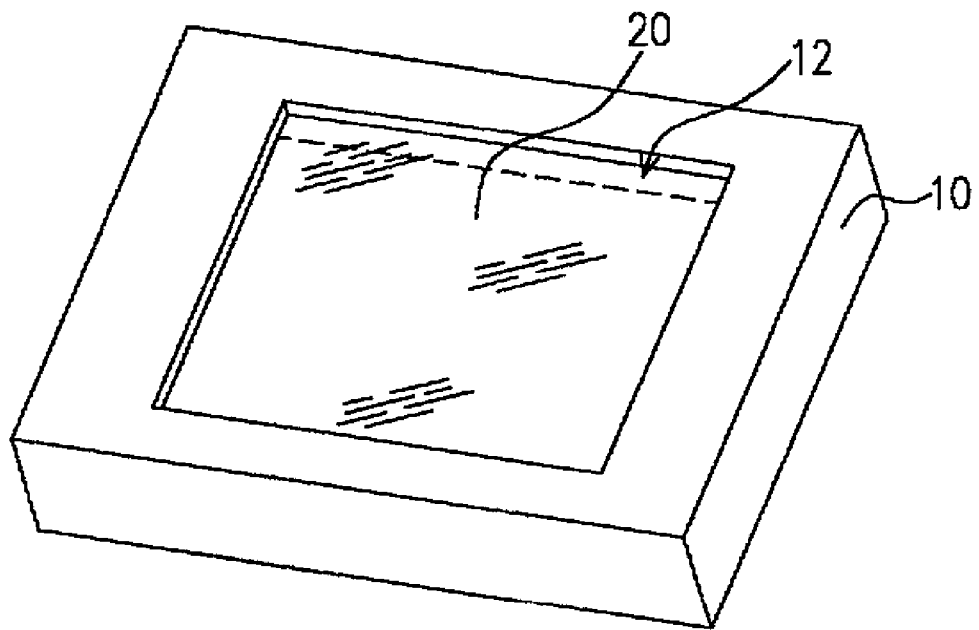
Figure 2A:
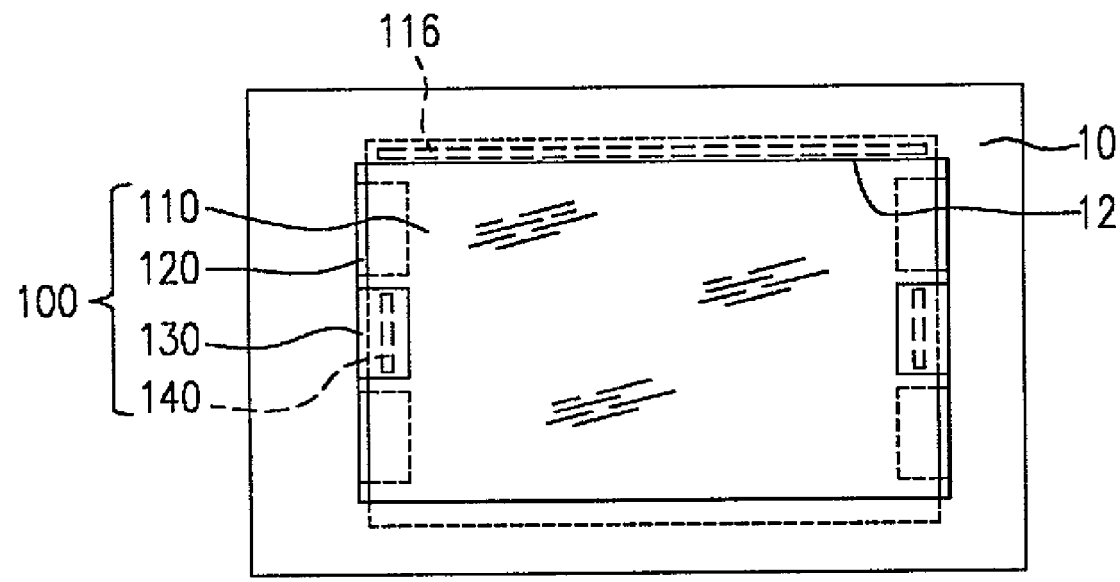
FIGS. 2A and 2B are a top view and cross-sectional view of a floating window disposed on a top lid of a flatbed scanner according to the invention.
Figure 2B:
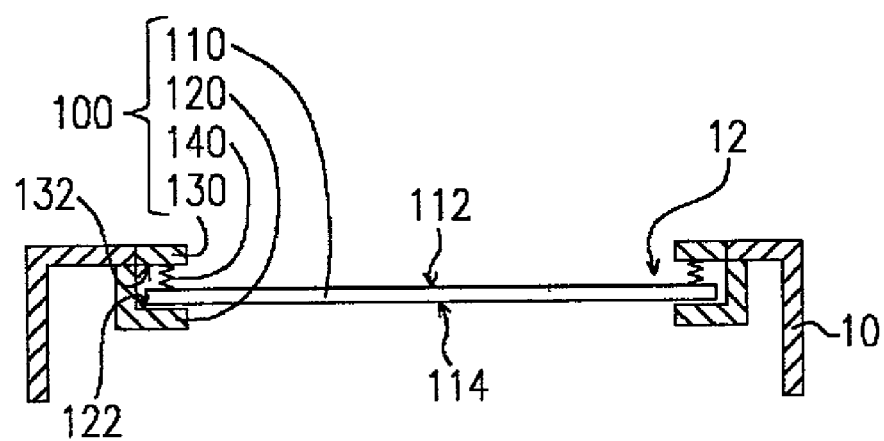

Referring to FIGS. 2A and 2B, a top view and a cross-sectional view of an embodiment of a floating window are schematically shown. The top lid 10 of the flatbed scanner has an opening 12 therein. The floating window 100 is embedded in the opening 12. The floating window 100 comprises a transparent flat panel 110, a supporting member 120, a limiting member 130 and a flexible member 140. The material of the transparent flat panel 110 includes glass or transparent plastic. The transparent flat panel 110 has a top surface 112 and an opposing bottom surface 114. The transparent flat panel 110 can be either disposed under or over the opening 12. In addition, the area of the transparent flat panel 110 is slightly larger than that of the opening to provide a complete coverage thereof. However, as shown in FIG. 2B, two sides of the transparent flat panel 110 do not completely cover the opening 12 for the sake of description convenience.

As shown in FIGS. 2A and 2B, the supporting member 120 of the floating window 100 is disposed on a surface of the top lid 10, for example, on a bottom surface of the top lid 10. The supporting member 120 extends under an edge or a periphery of the bottom surface 114 of the transparent flat panel 110 and is integrally formed with the surface of the top lid 10. The supporting member 120 has a supporting surface 122 located under the edge or periphery of the bottom surface of the transparent flat panel 110 to be in contact with and support the edge or periphery of the bottom surface 114.

Similar to FIGS. 2A and 2B, the limiting member 130 of the floating window 100 is also located on the surface of the top lid 10, for example, on an inner wall of the opening 12 of the top lid 10. The limiting member 130 extends over the edge or periphery of the transparent flat panel 110 and is formed integrally with the surface of the top lid 10. The limiting member 130 has a limiting surface 132, which is located over the edge or periphery of the top surface 112 of the transparent flat panel 110 in correspondence with the position of the supporting surface 122. The distance between the supporting surface 122 and the limiting surface 132 is slightly larger than a thickness of the transparent flat panel 110 to allow a vertical movement of the transparent flat panel 110 along a normal direction of the top surface 112 (or the bottom surface 114).

As shown in FIGS. 2A and 2B, the flexible member 140 of the floating window 100 is disposed between the edge of the top surface 112 of the transparent flat panel 110 and the limiting surface 132 of the limiting member 130. Therefore, the flexible member 140 presses the edge of the bottom surface 112 of the transparent flat panel 110 downward. Meanwhile, the edge of the bottom surface 114 of the transparent flat panel 110 is in contact with the supporting surface 122 of the supporting member 120. Therefore, the transparent flat panel 110 is experiencing an upward supporting force provided by the supporting member 120. The flexible member 140 includes the foldable dust-proof cloth. After being folded, the flexibility allows it to be applicable as the material of the flexible member 140.

In the floating window 100 as shown in FIG. 2A, the supporting member 120 can be divided into four parts, which are located under the edges at two sides of the bottom surface 114 of the transparent flat panel 110, respectively. The limiting member 130 has two parts located over the edge at two sides of the top surface 112 of the transparent flat panel 110 in correspondence with the positions of the supporting member 120. The flexible member 140 is located between the limiting member 130 and the transparent flat panel 110, while a portion of the transparent flat panel 110 extends under the opening 12 and other region.

Figure 3:
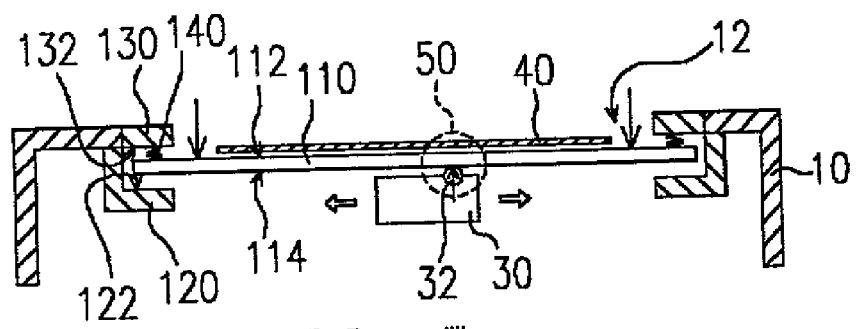
FIG. 3 is a schematic drawing showing the operation of a floating window applied to a flatbed scanner.

To describe the function of the floating window 100 in detail, please refer to FIG. 3, in which the operation of the floating window 100 of a flatbed scanner is schematically shown. The optical scan module 30 of the flatbed scanner is located under the opening 12 of the top lid 10. Being driven by a driving apparatus, the optical scan module 30 moves periodically along the arrows to scan a document 40 disposed on the top surface 112 of the transparent flat panel 110. A pushing device 32 is also installed over the optical scan module 30 to push the bottom surface 114 of the transparent flat panel 110. Thereby, the transparent flat panel 110 is pushed upward slightly; and consequently, the flexible member 140 is slightly compressed upward, so that a downward elastic force is generated by the flexible member 140.

As mentioned above, when the optical scan module 30 is periodically shifted under the optical scan module 30, the pushing device 32 is consequently driven to move. The pushing device 32 is always in contact with the bottom surface 114 of the transparent flat panel 110, so that the distance between the optical scan module 30 and the transparent flat panel 110 is kept constant. That is, during the whole scanning operation of the optical scan module 30, the optical scan module 30 is spaced from the document 40 by a constant distance. That is, the invention uses the elastic force applied to the transparent flat panel 110 generated by the flexible member 140 to allow a vertical movement between the supporting member 120 and the limiting member 130 in correspondence with a slight undulation of the optical scan module 30. As a result, the distance between the optical scan module 30 and the transparent flat panel 110 is kept constant for the whole scanning process. Consequently, the distance between the document 40 disposed on the transparent flat panel 110 and the optical scan module 30 is kept constant.

Figure 4A:
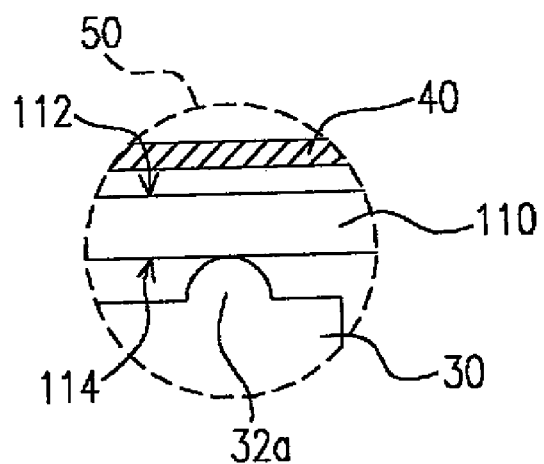
FIGS. 4A and 4B are local enlarged views of portions of FIG. 3.
Figure 4B:
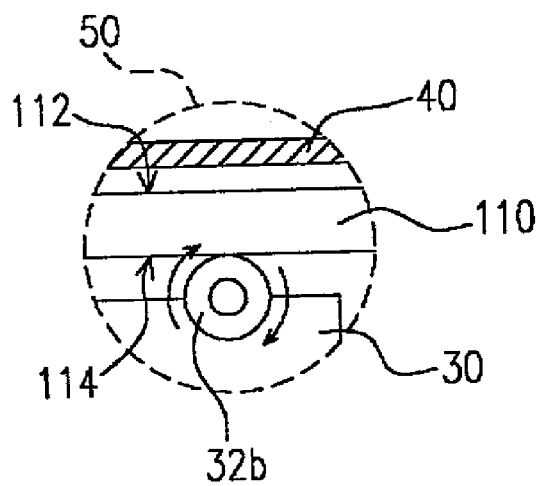

Referring to FIGS. 3, 4A and 4B, where FIGS. 4A and 4B show local enlarged views of FIG. 3, the pushing device 32 of the optical scan module 30 pushes the bottom surface 114 of the transparent flat panel 110 upwardly. In FIG. 4A, the pushing device 32 includes a cam 32a formed on top of the optical scan module 30 to correspond to the periodic displacement of the optical scan module 30. The pushing device 32 moves slides under the bottom surface 114 of the transparent flat panel 110, and the cam 32a can be formed integrally with the optical scan module 30. In addition, as shown in FIG. 4B, the pushing device 32 can also be a pushing drum 32b pivotally mounted on top of the optical scan module 30. Similarly, in response to the periodic movement of the optical scan module 30, the drum 32b rolls underneath the bottom surface 114 of the transparent flat panel 110. In addition, to prevent the movement of the pushing device 32 from being interfered with by the supporting member 120, as shown in FIG. 2A, the transparent flat panel 110 can extend beyond the region under the opening 12. For example, the extension towards the edges of the transparent flat panel 110 can be used as the displacement region of the pushing device 32 as shown in FIG. 3.

In the embodiment of the invention, the transparent flat panel is allocated between the supporting member and the limiting member, and the flexible member is disposed between the limiting member and the transparent flat panel to allow the transparent flat panel entering a floating state upon being pushed by the optical scan module and pressed by the flexible member. As a result, the document disposed on the transparent flat panel is undulated up and down in accordance with the movement of the optical scan module. The distance between the document and the optical scan module can be kept constant during the scan process, so that the image scan quality of the flatbed scanner can be improved.

In addition, a periphery of the top surface of the transparent flat panel can be indirectly adhered to a periphery of the bottom surface surrounding the opening of the top lid via the flexible member. That is, the flexible member is disposed between the edge of the top surface of the transparent flat panel and the edge of the bottom surface of the top lid to achieve the floating effect. In addition, the floating window may include the above supporting structure and limiting structure disposed on the surface of the top lid. Using similar connection, the supporting structure and the limiting structure are positioned at the edges of the transparent flat panel. Further, the distance between the supporting member and the limiting member is slightly larger than the thickness of the transparent flat panel, such that the transparent flat panel can make a vertical movement between the supporting surface and the limiting surface to achieve a floating effect.

According to the above, the floating window allows the transparent flat panel undulating vertically with respect to the optical scan module, so that the distance between the document disposed on the transparent flat panel and the optical scan module is kept constant. Therefore, the image scan quality of the flatbed scanner is effectively enhanced, particularly for those scanning systems with a contact image sensor or high-resolution or shallow depth optical scan modules.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

The invention of claimed is:

1. A flatbed scanner, comprising:
   a transparent flat panel comprising a top surface and a bottom surface;
   a top lid comprising an opening, a supporting member and a limiting member, the opening being disposed adjacent to the top surface of the transparent flat panel, the supporting member comprising a supporting surface disposed adjacent to the bottom surface of the transparent flat panel, and the limiting member being disposed adjacent to a peripheral portion of the top surface of the transparent flat panel;
   an optical scan module capable of being selectably shifted under the transparent flat panel and capable of pushing the bottom surface of the transparent flat panel toward the top lid as the optical scan module shifts; and
   a flexible member capable of pressing the top surface of the transparent flat panel away from the top lid, the flexible member being disposed between the top surface of the transparent flat panel and the limiting surface of the limiting member.

2. The flatbed scanner according to claim 1, wherein the optical scan module further comprises a pushing device capable of pushing the transparent flat panel toward the top lid.

3. The flatbed scanner window according to claim 2, wherein the pushing device comprises a cam that slides under the bottom surface of the transparent flat panel.

4. The flatbed scanner according to claim 2, wherein the pushing device comprises a pushing drum that rolls horizontally under the bottom surface of the transparent flat panel.

5. The flatbed scanner according to claim 2, wherein the transparent flat panel extends to a region beyond the opening of the top lid, and wherein a moving area of the pushing device includes a part of the region of the transparent flat panel beyond the opening.

6. The flatbed scanner according to claim 1, wherein the supporting member is integrally formed with the top lid.

7. The flatbed scanner according to claim 1, wherein the limiting member integrally formed with the top lid.

8. A flatbed scanner, comprising:
   a transparent flat panel comprising a top surface and a bottom surface;
   a top lid comprising an opening, the opening being disposed adjacent to the top surface of the transparent flat panel;
   an optical scan module capable of being selectably shifted under the transparent flat panel and capable of pushing the bottom surface of the transparent flat panel toward the top lid as the optical scan module shifts: and
   a flexible member capable of pressing the top surface of the transparent flat panel away from the top lid, the flexible member being disposed between the top surface of the transparent flat panel and the top lid.

9. The flatbed scanner according to claim 8, wherein the optical scan module further comprises a pushing device capable of pushing the transparent flat panel toward the top lid.

10. The flatbed scanner according to claim 9, wherein the pushing device comprises a cam that slides under the bottom surface of the transparent flat panel.

11. The flatbed scanner according to claim 9, wherein the pushing device comprises a rolling drum that rolls horizontally under the bottom surface of the transparent flat panel.

12. The flatbed scanner according to claim 9, wherein the transparent flat panel extends to a region beyond the opening of the top lid, and
   wherein a moving area of the pushing device includes a part of the region of the transparent flat panel beyond the opening.

13. A flatbed scanner, comprising
   a transparent flat panel comprising a top surface and a bottom surface;
   a top lid comprising an opening, a supporting member and a limiting member, the opening being disposed adjacent to the top surface of the transparent flat panel, the supporting member comprising a supporting surface disposed adjacent to the bottom surface of the transparent flat panel, and the limiting member being disposed adjacent to a peripheral portion of the top surface of the transparent flat panel, a distance between the supporting surface of the supporting member and the limiting member allowing the transparent flat panel to move toward the top lid; and
   an optical scan module capable of being selectably shifted under the transparent flat panel and capable of pushing the bottom surface of the transparent flat panel toward the top lid as the optical scan module shifts.

14. The flatbed scanner according to claim 13, further comprising a flexible member capable of pressing the top surface of the transparent flat panel away from the top lid, the flexible member being disposed between the top surface of the transparent flat panel and the limiting surface of the limiting member.

15. The flatbed scanner according to claim 13, wherein the optical scan module further comprises a pushing device capable of pushing the transparent flat panel toward the top lid.

16. The flatbed scanner according to claim 15, wherein the pushing device comprises a cam that slides under the bottom surface of the transparent flat panel.

17. The flatbed scanner according to claim 15, wherein the pushing device comprises a rolling drum that rolls horizontally under the bottom surface of the transparent flat panel.

18. The flatbed scanner according to claim 15, wherein the transparent flat panel extends to a region beyond the opening of the top lid, and wherein a moving area of the pushing device includes a part of the region of the transparent flat panel beyond the opening.

19. The flatbed scanner according to claim 13, wherein the supporting member is integrally formed with the top lid.

20. The flatbed scanner according to claim 13, wherein the limiting member is integrally formed with the top lid.

21. A flatbed scanner, comprising:
a transparent flat panel comprising a top surface and a bottom surface;
a top lid comprising an opening, a supporting member and a limiting member, the opening being disposed adjacent to the top surface of the transparent flat panel, the supporting member comprising a supporting surface disposed adjacent to the bottom surface of the transparent flat panel, and the limiting member being disposed adjacent to a peripheral portion of the top surface of the transparent flat panel;
optical scan means for being selectably shifted under the transparent flat panel and for pushing the bottom surface of the transparent flat panel toward the top lid as the optical scan module shifts; and
a flexible member means for pressing the top surface of the transparent flat panel away from the top lid, the flexible member means being disposed between the top surface of the transparent fiat panel and the limiting surface of the limiting member.

22. The flatbed scanner according to claim 21, wherein the optical scan means further comprises a pushing means for pushing the transparent flat panel toward the top lid.

23. The flatbed scanner window according to claim 22, wherein the pushing means comprises a cam that slides under the bottom surface of the transparent flat panel.

24. The flatbed scanner according to claim 22, wherein the pushing means comprises a rolling drum that rolls horizontally under the bottom surface of the transparent flat panel.

25. The flatbed scanner according to claim 22, wherein the transparent flat panel extends to a region beyond the opening of the top lid, and
wherein a moving area of the pushing means includes a part of the region of the transparent flat panel beyond the opening.

26. The flatbed scanner according to claim 21, wherein the supporting member is integrally formed with the top lid.

27. The flatbed scanner according to claim 21, wherein the limiting member is integrally formed with the top lid.

28. A flatbed scanner, comprising:
a transparent flat panel comprising a top surface and a bottom surface;
a top lid comprising an opening, the opening being disposed adjacent to the top surface of the transparent flat panel;
optical scan means for being selectably shifted under the transparent flat panel and for pushing the bottom surface of the transparent flat panel toward the top lid as the optical scan module shifts; and
a flexible member means for pressing the top surface of the transparent flat panel away from the top lid, the flexible member means being disposed between the top surface of the transparent flat panel and the top lid.

29. The flatbed scanner according to claim 28, wherein the optical scan means further comprises a pushing means for pushing the transparent flat panel toward the top lid.

30. The flatbed scanner according to claim 29, wherein the pushing means comprises a cam that slides under the bottom surface of the transparent flat panel.

31. The flatbed scanner according to claim 29, wherein the pushing means comprises a rolling drum that rolls horizontally under the bottom surface of the transparent flat panel.

32. The flatbed scanner according to claim 29, wherein the transparent flat panel extends to a region beyond the opening of the top lid, and
wherein a moving area of the pushing means includes a part of the region of the transparent fiat panel beyond the opening.

33. A flatbed scanner, comprising
a transparent flat panel comprising a top surface and a bottom surface;
a top lid comprising an opening, a supporting member and a limiting member, the opening being disposed adjacent to the top surface of the transparent flat panel, the supporting member comprising a supporting surface disposed adjacent to the bottom surface of the transparent flat panel, and the limiting member being disposed adjacent to a peripheral portion of the top surface of the transparent flat panel, a distance between the supporting surface of the supporting member and the limiting member allowing the transparent flat panel to move toward the top lid; and
optical scan means for being selectably shifted under the transparent flat panel and for pushing the bottom surface of the transparent flat panel toward the top lid as the optical scan module shifts.

34. The flatbed scanner according to claim 33, further comprising a flexible member means for pressing the top surface of the transparent flat panel away from the top lid, the flexible member means being disposed between the top surface of the transparent flat panel and the limiting surface of the limiting member.

35. The flatbed scanner according to claim 33, wherein the optical scan means further comprises a pushing means capable of pushing the transparent flat panel toward the top lid.

36. The flatbed scanner according to claim 35, wherein the pushing means comprises a cam that slides under the bottom surface of the transparent flat panel.

37. The flatbed scanner according to claim 35, wherein the pushing means comprises a rolling drum that rolls horizontally under the bottom surface of the transparent flat panel.

38. The flatbed scanner according to claim 35, wherein the transparent flat panel extends to a region beyond the opening of the top lid, and
wherein a moving area of the pushing means includes a part of the region of the transparent flat panel beyond the opening.

39. The flatbed scanner according to claim 33, wherein the supporting member is integrally formed with the top lid.

40. The flatbed scanner according to claim 33, wherein the limiting member is integrally formed with the top lid.

* * * * *

UNITED STATES PATENT AND TRADEMARK OFFICE
CERTIFICATE OF CORRECTION

PATENT NO. : 7,359,096 B2  Page 1 of 1
APPLICATION NO. : 10/063739
DATED : April 15, 2008
INVENTOR(S) : Yin-Chun Huang et al.

It is certified that error appears in the above-identified patent and that said Letters Patent is hereby corrected as shown below:

On the title page, at column 2 (Abstract), line 6, delete "Installed" and insert -- installed --, therefor.

At column 7, line 26, delete "fiat" and insert -- flat --, therefor.

At column 8, line 12, delete "fiat" and insert -- flat --, therefor.

Signed and Sealed this

Twenty-fifth Day of August, 2009

David J. Kappos
*Director of the United States Patent and Trademark Office*